May 4, 1965  R. E. GANG ETAL  3,182,231
MAGNET POLE CAP CONSTRUCTION
Filed Sept. 26, 1960  4 Sheets-Sheet 1
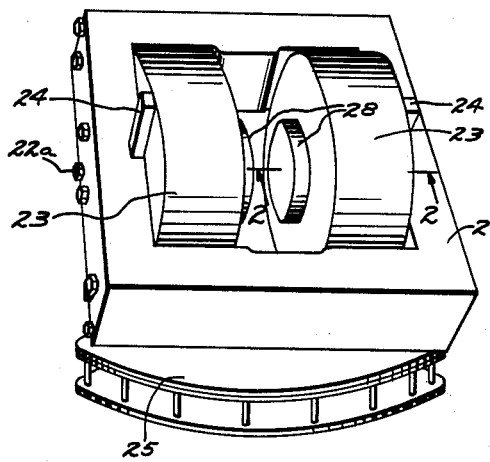
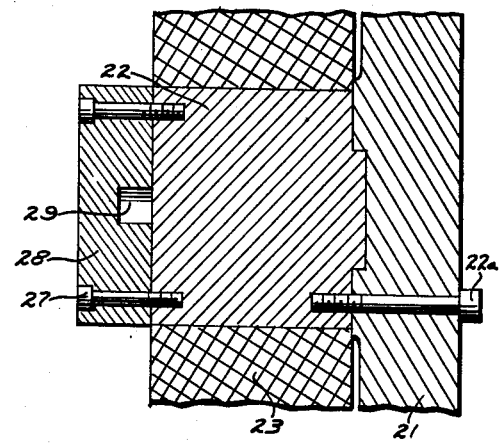
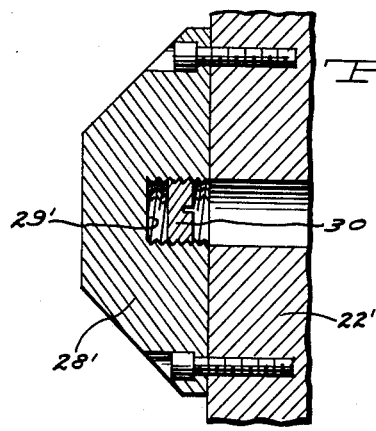
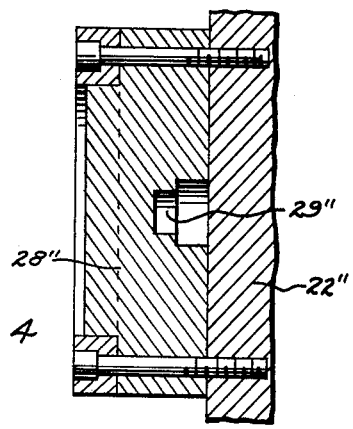
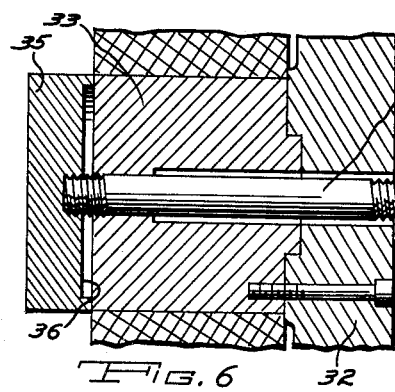
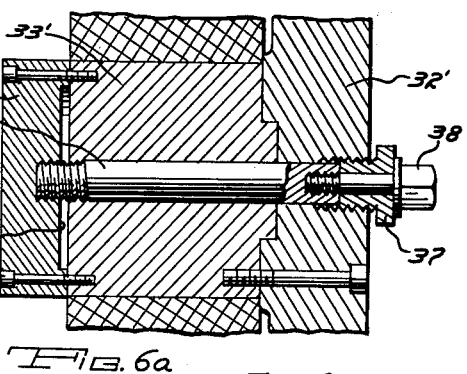
Inventors
Robert E. Gang
Forrest A. Nelson
By Wm J. Nolan
Attorney

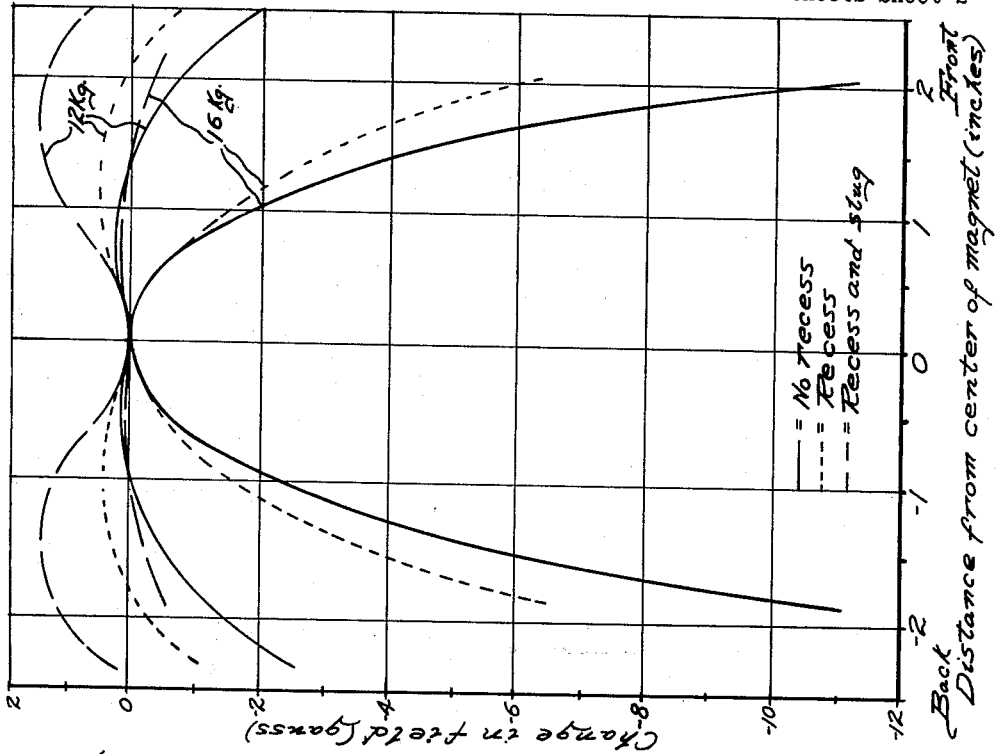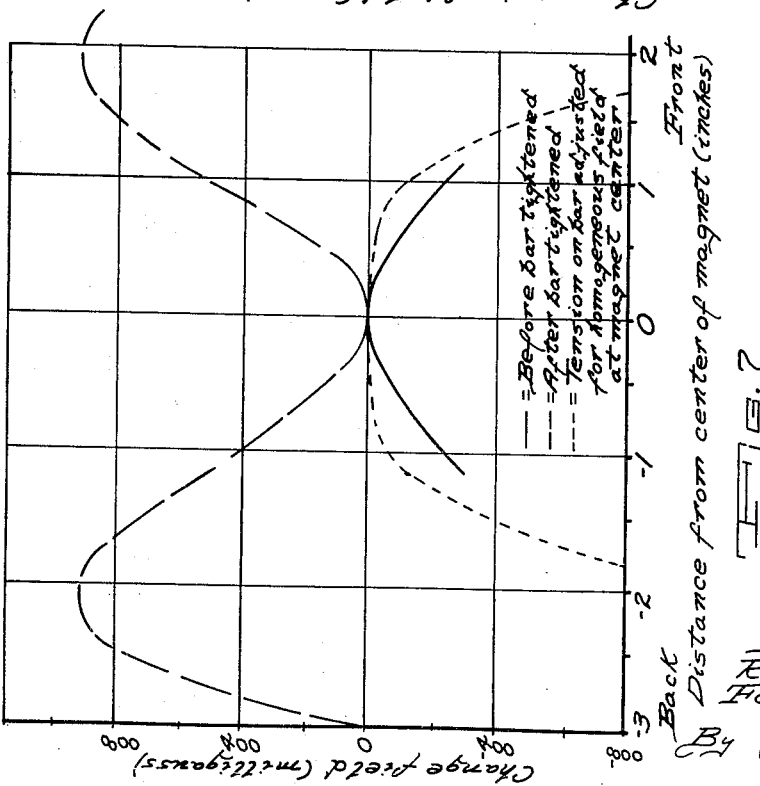

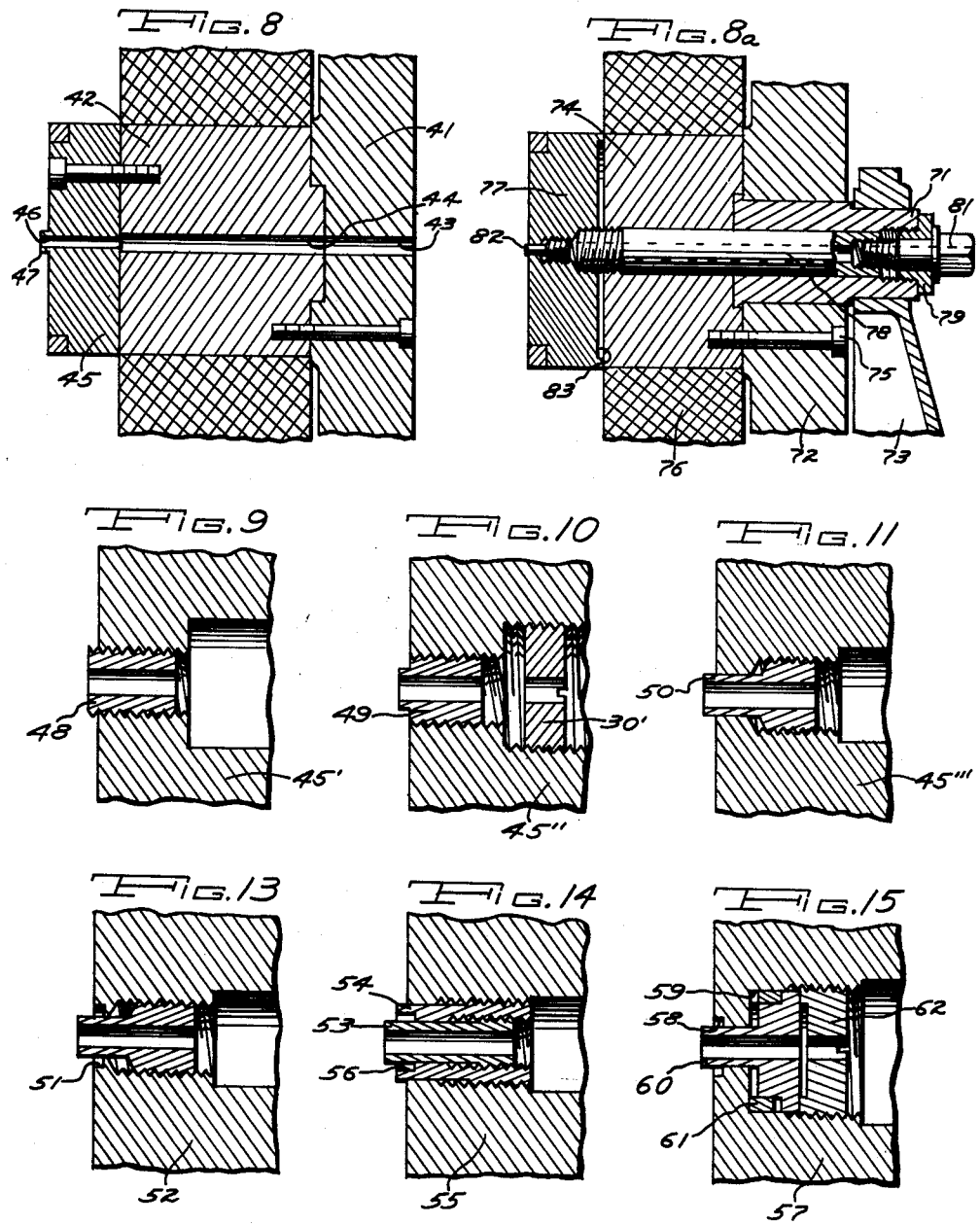

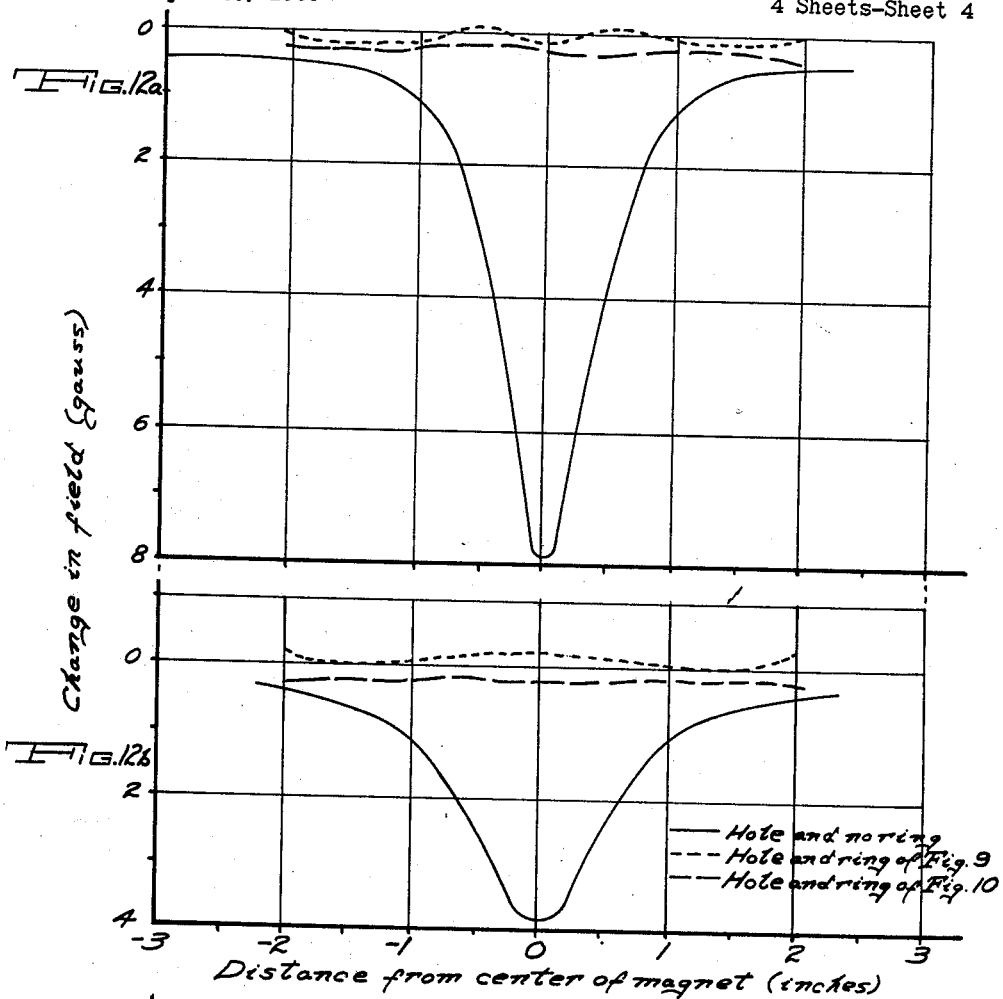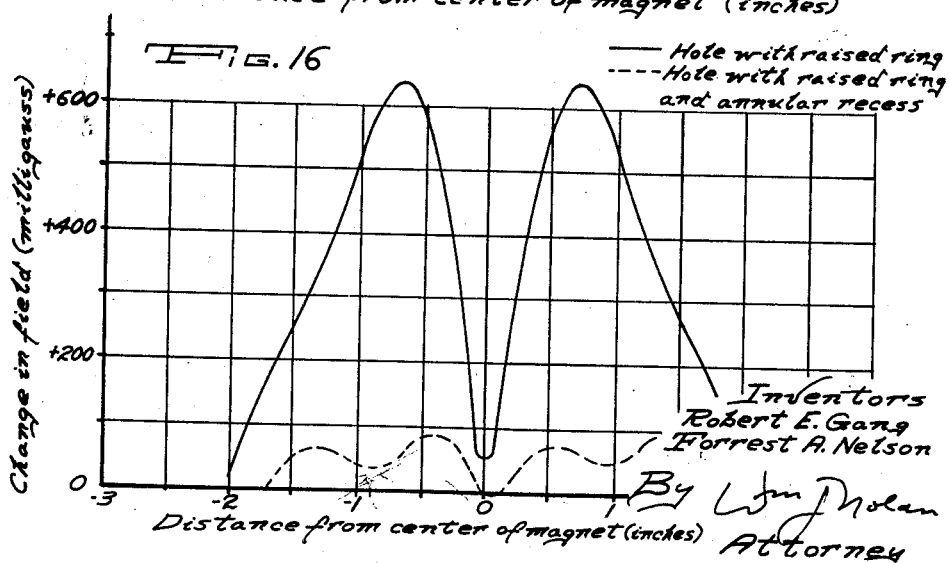

United States Patent Office 3,182,231
Patented May 4, 1965

3,182,231
MAGNET POLE CAP CONSTRUCTION
Robert E. Gang, Sunnyvale, and Forrest A. Nelson, Palo
Alto, Calif., assignors to Varian Associates, Palo Alto,
Calif., a corporation of California
Filed Sept. 26, 1960, Ser. No. 58,298
12 Claims. (Cl. 317—158)

The present invention relates in general to magnets and more specifically to novel constructions and apparatus for providing minute adjustments in the field pattern of a magnet whereby the homogeneity of the magnetic field produced by the magnet can be greatly enhanced. Such magnets which produce an extremely homogeneous magnetic field are useful in gyromagnetic resonance spectroscopy applications where the resolution obtainable becomes a direct function of the homogeneity of the magnetic field employed.

Heretofore, high homogeneous magnetic fields have been attained by several different means. One such means has been to shim the pole faces of the magnet and another has been to apply a substantial bending moment to the yoke of the magnet to provide a slight angular displacement of the plane of the magnet pole faces.

The present invention relates to novel construction and apparatus for enhancing the homogeneity of the magnetic field of a magnet and which can be utilized either alone or in combination with the means utilized in the past.

The principal object of the present invention is to provide a novel construction and apparatus for effecting small adjustments in the field pattern of a magnet whereby the homogeneity of the magnetic field at the air gap of the magnet may be greatly enhanced, as desired.

One feature of the present invention is the provision of a novel magnet pole cap provided with a recess in the back surface thereof whereby a high homogeneous magnetic field is provided across the magnet air gap.

Another feature of the present invention is the provision of a novel magnet pole cap provided with a recess in the back surface thereof and means for changing the size of the recess whereby desirable modifications of the magnetic field pattern across the air gap may be obtained.

Another feature of the present invention is the provision of a novel magnet pole cap provided with a shallow large diameter recess in the back surface thereof and means for applying a force to the pole cap whereby the front surface of the pole cap may be bent to enhance the homogeneity of the magnetic field at the gap of the magnet.

Another feature of the present invention is the provision of a novel magnet pole cap with a bore therethrough for providing access to the air gap of the magnet and a raised ring on the front surface of said pole cap around said bore thereby to provide a highly homogeneous magnetic field across the magnet air gap into which access is provided through the bore through said pole cap.

Another feature of the present invention is the provision of a novel magnet pole cap provided with a bore therethrough for providing access to the air gap of the magnet and an adjustable raised ring on the front surface of said pole cap around said bore, an annular recess being provided in the front surface of said pole cap concentric with and outside said raised ring whereby a highly homogeneous magnetic field is provided across the magnet air gap into which access is provided through said bore in said pole cap.

Still another feature of the present invention is the provision of a novel means for enhancing the field homogeneity of a magnet by providing a recess of desired size in the back surface of at least one magnet pole cap.

Still another feature of the present invention is the provision of a novel means for enhancing the magnetic field homogeneity of a magnet by applying a force to at least one pole cap thereof, thereby to bend the pole cap and change the magnetic flux and pattern as desired.

Still another feature of the present invention is the provision of a novel means for enhancing the magnetic field of the magnet and providing access to the air gap thereof by providing a bore through at least one of the pole caps of said magnet, providing a raised ring on the front surface of said pole cap about the bore therethrough and adjusting the height of said raised ring to change the magnetic field strength and pattern as desired.

Another feature of the present invention is the provision of the novel means of the last aforementioned feature including the additional step of providing an annular recess in the front surface of said pole cap surrounding said raised ring and adjusting the depth of said annular recess to change the magnetic field strength and pattern as desired.

These and other features and advantages of the present invention may be more apparent after a perusal of the following specification taken in connection with the accompanying drawings, wherein FIG. 1 is a perspective view of a magnet assembly including certain novel features of the present invention, FIG. 2 is a cross-sectional view of a portion of the structure of FIG. 1 taken along line 2—2 in the direction of the arrows, FIG. 3 is a side cross-sectional view of an alternative embodiment of the structure shown in FIG. 2, FIG. 4 is a side cross-sectional view of an alternative pole cap construction, FIG. 5 is a graph of the change in magnetic field strength plotted against the distance from the center of the magnet air gap taken along a line parallel to the front surface of the magnet pole faces through the center of the air gap for three different pole cap constructions and two different magnetic flux patterns, FIG. 6 is a side cross-sectional view of another embodiment of the present invention, FIG. 6a is a side cross-sectional view of an alternative embodiment of the structure shown in FIG. 6, FIG. 7 is a graph similar to FIG. 5 and for the structure of FIG. 6, FIG. 8 is a side cross-sectional view of still another embodiment of the present invention, FIG. 8a is a side cross-sectional view of an alternative embodiment of the structure shown in FIG. 8, FIGS. 9–11 are side cross-sectional views of other alternative pole cap constructions, FIG. 12a is a graph of the change in magnetic field plotted against distance from the center of the magnet taken in a plane parallel to a pole cap with a bore therethrough for different pole cap constructions, FIG. 12b is a graph similar to FIG. 12a for a plane a different distance from the pole cap, FIGS. 13–15 are side cross-sectional views of other alternate pole cap constructions, and FIG. 16 is a graph similar to FIG. 5 for a given magnetic field and for the structures of FIGS. 13–15.

Referring now to the drawings, especially FIGS. 1 and 2, there is shown an electromagnet which embodies certain features of this invention. This electromagnet includes a substantially rectangular yoke 21 of a highly permeable material such as, for example, iron which carries two magnetic pole members 22 colinearly disposed in spaced apart relationship, the pole members 22 being held onto the yoke 21 by screws 22a. Electric coil assemblies 23 are coaxially mounted on each of the mutually opposed pole members 22 and are supplied with electrical current in such a fashion as to make one of the poles north and the other pole south. Each of the coil assemblies 23 is fixedly secured to a bar 24 which is held on the yoke 21 by screws. The rectangular yoke 21 is supported on a magnet stand 25 by yoke supports, not shown.

Fixedly secured to each of the pole members 22 by means of screws 27 is a substantially cylindrical pole cap 28. The front corner of the pole cap could also be tapered as shown in FIG. 3 or provided with ring shims as shown in FIG. 4. The back of the pole cap is provided with a cylindrical recess 29, the size of which is determined experimentally to provide the desired magnetic field pattern for a particular magnetic field strength, a typical example being described in detail below with reference to FIG. 5.

Referring now to FIG. 3, both the yoke, not shown, and the magnetic pole member 22' are provided with bores therethrough which provide access to the recess 29' provided in the back surface of the pole cap 28'. The recess 29' is provided with threads whereby an outwardly threaded adjustable magnetic slug 30 can be screwed into the recess 29' to change the pattern of the magnetic field of the magnet as illustrated in detail with reference to FIG. 5 below. The bores through the yoke and the pole member 22' enable adjustment of the position of the slug 30 to be made from the back of the pole cap 28' with the pole cap screwed to the face of the pole member 22'.

Recesses with more complicated configurations such as the stepped diameter recess 29" shown in FIG. 4 can be used for providing more refined magnetic field patterns in the gap of the magnet.

Referring now to FIG. 5, there is shown a graph of change in magnetic field strength plotted against distance from the center of the magnet air gap taken along a line through the center of the magnet air gap and parallel with the front faces of the pole caps. The curves shown on this graph were taken using a laboratory electromagnet provided with tapered pole caps, such as shown in FIG. 3, 12" diameter tapered to 10" and 1⅞" thick. The magnet air gap was 1.18". In the graph the solid curves indicate the magnetic field pattern for two different values of magnetic field strength, 12 and 16 kilogauss when there was no recess in the back of the pole caps. The dotted curves show the magnetic field pattern for the two selected magnetic field strengths with a cylindrical recess in the back of the pole caps. This particular recess was 1¼" in diameter and ¾" deep. From the graph it can be seen that the homogeneity for the different field strengths was enhanced while the 12 kilogauss field was slightly overcompensated. The deeper the recess is made, the greater the overcompensation becomes so that a recess of optimum size can be chosen for any desired field strength. The dashed curves show the magnetic field pattern for the two different magnetic field strengths for a recess with an adjustable magnetic slug as shown in FIG. 3. For the particular curves shown the recess was 1¼" in diameter and 1⅛" deep and the slug was 1¼" in diameter and ⅜" thick, the slug for the particular curves shown being positioned in the bottom of the hole. With this particular structure the field pattern for the 16 kilogauss field is nearly optimum. As the slug 30 is moved out of the recess the adjustment of the field pattern will be in the direction of overcompensation.

In an alternative embodiment of the present invention, the pole caps can be provided with a shallow large diameter recess in the back surface thereof, and if force is applied to the pole cap, then the front surface of the pole cap can be bent to achieve a more desirable field pattern. This embodiment is illustrated in FIG. 6, wherein a yoke 32 and a pole member 33 are provided with a bore therethrough for a drawbar 34 one end of which screws into a threaded bore in the back of a pole cap 35 which is provided with a shallow large diameter recess 36. The outwardly extending end of the drawbar 34 is threaded, and when a nut 36a is screwed thereon bearing against the yoke 32, the pole cap 35 is held against the pole member 33. By tightening the nut 36a the front surface of the pole cap 35 is slightly deformed to change the pattern of the magnetic field in the gap as illustrated in detail below with reference to FIG. 7. Instead of the drawbar 34 the pole caps 35 could be held on to the pole piece 33 by means of screws positioned closer to the center of the pole cap 35 than the ridge which surrounds the recess 36 on the back of the pole cap whereby when the screws are tightened the front of the pole cap is deformed.

Many different arrangements can be devised using a pole cap with a shallow, large diameter recess whereby a force can either be applied forward or backward against the pole cap to bend the front surface of the pole cap thereby to enhance the magnetic field homogeneity of the magnet. One such arrangement is shown in FIG. 6a wherein a yoke 32' and a pole member 33' are provided with bores therethrough for a drawbar 34' one end of which screws into a threaded bore in the back of a pole cap 35'. The pole cap 35' is provided with a shallow large diameter recess 36' in the back surface thereof and is held onto the pole member 33' by screws 27' spaced about its periphery. The outer end of the bore in the yoke 32' is threaded and a hollow pole cap tightening screw 37 is threaded into this bore. The outwardly extending end of the drawbar 34' is provided with a threaded bore into which is securely tightened a cap nut 38 the shank of which fits within the pole cap tightening screw 37. As viewed in FIG. 6a by moving the pole cap tightening screw 37 to the right a force is applied to the cap nut 38 and thus to the drawbar 34' to cause the outer surface of the pole cap 35' to become concave, whereas by moving the pole cap tightening the screw 37 to the left a force is applied to the drawbar to cause the outer surface of the pole cap 35' to become convex. In this manner the homogeneity of the magnetic field in the magnet air gap can be adjusted as desired.

Referring now to FIG. 7 there is shown a graph of the change in magnetic field strength plotted against the distance from the center of the magnet air gap for the structure shown in FIG. 6. The actual structure used was an electromagnet with cylindrical pole caps 12" in diameter, 1¾" thick and with a recess in the back thereof .002" deep. The magnet air gap was 1.75". The solid curve is a plot of the magnet field pattern before tension was applied to the pole cap 35 by the drawbar 34 and the nut 36, and the dashed curve shows the field pattern after a high degree of tension was applied to the pole cap 35. The dotted curve shows a plot of field pattern with the tension on the bar adjusted for a homogeneous field at the magnet center. As can be seen from the graph, the desirable field pattern for the particular magnetic field strength of interest can be selected by applying the proper tension to the drawbar 34.

Often it is desirable to provide access into the air gap between the magnet pole caps either to insert a tool or a sample into the air gap or to direct some sort of irradiation onto a sample positioned within the air gap. A plane hole through a pole member and a pole cap would greatly change the homogeneity of the magnetic field within the air gap as illustrated in detail below.

A further embodiment of the present invention is to provide novel method and means for providing access to the air gap through a pole cap without substantially affecting the magnetic field homogeneity within the gap.

Referring now to FIG. 8 wherein is shown a cross section of one side of an electromagnet, the yoke 41 and the pole member 42 are provided with bores 43 and 44, respectively, therethrough which are axially aligned with the center of the air gap of the magnet. A pole cap 45 is provided with a bore 46 therethrough in line with the bores 43 and 44 whereby access is provided into the magnet air gap through the pole cap 45. A raised ring 47 is provided around the bore 46 in the pole cap 45 to compensate for the nonhomogeneity of the magnet field in the magnet air gap created by the bore in the pole cap 45. The raised ring 47 is preferably made adjustable to provide enhanced magnetic field homogeneity for different magnetic field strengths.

An adjustable raised ring can be made by providing an adjustable sleeve within the bore through the pole cap. Such an adjustable sleeve could take many different forms such as an outwardly threaded hollow cylinder as shown in FIG. 9 or an outwardly threaded hollow cylinder provided with an unthreaded portion of reduced diameter extending from the outward end thereof as shown in FIG. 10. Also, the adjustable sleeve could be a hollow cylinder 50 provided with a threaded enlarged inner end which would move on threads provided in an enlarged diameter portion of the bore through the pole cap 45‴ as shown in FIG. 11. The type of homogeneous magnetic field which adjustable sleeves of this nature provide in the magnet air gap will be illustrated in greater detail below with reference to FIG. 12.

Referring now to FIGS. 12a and 12b, there are shown graphs of the change in the magnetic field strength plotted against the distance from the center of the magnet taken along lines parallel to the pole face and a given distance therefrom at the magnet center, plots being shown in FIGS. 12a and 12b for lines at the center of the magnet ⅞″ and 1⅛″ respectively from a pole cap with a bore therethrough. The structure that was used in taking the data displayed in this graph was an electromagnet providing a field of 9400 gauss in an air gap of 1.75″ with cylindrical pole caps 12″ in diameter and 1¾″ thick. A .25″ diameter bore was provided in the center of an adjustable sleeve in one of the pole caps. The solid curves are plots of the magnetic field pattern in gauss for the adjustable sleeve structure shown in FIG. 9 with the front of the adjustable sleeve 48 flush with the front surface of the pole cap 45′. The dotted curves are plots of the magnetic field pattern in milligauss for the adjustable sleeve structure shown in FIG. 9 with the front of the adjustable sleeve 48 protruding .008″ past the front surface of the pole cap 45′. The dashed curves are plots of the magnetic field pattern in milligauss for the adjustable sleeve structure shown in FIG. 10 with the unthreaded portion of the adjustable sleeve 49 protruding .045″ past the front surface of the pole cap 45″. From the curves shown in FIGS. 12a and 12b it can be seen that a magnet with a hole through one of the pole caps thereof can be provided with a highly homogeneous magnetic field by means of raised rings surrounding the bore through the pole cap.

Either the plane recess in the back of the pole cap or the adjustable slug in a recess in the back of the pole cap as shown and described above with respect to FIGS. 2 and 3, respectively, could be used in combination with adjustable raised rings to enhance the magnetic field homogeneity of a magnet with a bore in the pole cap. These combinations are illustrated in FIGS. 9 and 10, respectively. In FIG. 9 the bore through the pole cap 45′ has an enlarged diameter toward the back surface of the pole cap. In FIG. 10 an apertured slug screws in and out of an enlarged diameter portion of the bore opening toward the back of the pole cap 45″. Similarly, the back surface of a pole cap provided with a bore therethrough could have a shallow large diameter recess whereby the homogeneity of the magnetic field in the magnet air gap could be enhanced by bending the pole cap slightly as was explained above with reference to FIGS. 6–7. It has also been discovered that a raised ring which surrounds a bore through a pole cap and which is surrounded by a recessed portion enhances the homogeneity of the magnetic field to still a greater extent than a raised ring alone. This configuration could take the form of any one of the structures shown in FIGS. 13–15.

The structure of FIG. 13 is similar to that of FIG. 11 except with an annular recess 51 provided in the front surface of the pole cap 52 and surrounding the bore therethrough.

Referring now to FIG. 14, an inner, hollow cylindrical, adjustable sleeve 53 provided with threads of enlarged diameter on its inner end is positioned within an outer hollow, substantially cylindrical sleeve which is provided with inner and outer threads on the inner end thereof whereby it can be rotatably positioned within the bore through the pole cap 55 and the inner sleeve 53 rotatably positioned within this outer sleeve 54. An annular recess 56 is provided within the outer end of the outer sleeve 54 surrounding the inner sleeve 53.

In FIG. 15 a hollow cylindrical adjustable sleeve 60 is positioned within a bore in the pole cap 57 which has an annular recess 58 in the front surface thereof surrounding the bore therethrough. The bore through the pole cap 57 has an enlarged diameter opening 59 toward the back end thereof, and the adjustable sleeve 60 has an enlarged diameter at its inner end to fit within this enlarged diameter opening 59. A compression ring 61 is positioned at the bottom of the enlarged diameter opening 59 tending to force the adjustable sleeve 60 out of the back of the pole cap 57. An outwardly threaded hollow positioning nut 62 is screwed into the enlarged diameter opening 59 of the pole cap 57 from the back thereof to position the adjustable sleeve 60 therein against the force of the compression spring 61 so that the desired amount of the adjustable sleeve 60 protrudes past the front surface of the pole cap 57. The positioning nut 62 is provided with a notch or other means whereby it can be rotated by means of an instrument inserted through the bore in the yoke and the pole piece. The enhancement in the homogeneity of the magnetic field by means of the raised ring surrounded by a recessed portion, as described above, is illustrated in greater detail below with reference to FIG. 16.

Referring now to FIG. 16 there is shown a graph of the change in the magnetic field strength plotted against the distance from the center of the magnet taken along a line parallel to the apertured pole face and 1⅛″ therefrom at the magnet center. This data was taken with an electromagnet having 12″ cylindrical pole caps and a 2¼″ air gap and producing a magnetic field of substantially 8,000 gauss. A bore was provided in one of the pole caps with a raised ring surrounding this bore. The solid curve is a plot of the magnetic field pattern for a structure with a raised ring of 0.06″ and with no annular recess. The dotted curve is a plot of the magnetic field pattern for a structure with a raised ring of 0.059″ and with a 0.026″ deep annular recess surrounding the ring. From the graph, it is obvious that the magnetic field homogeneity of a magnet provided with a bore through one pole piece and a raised ring projecting therefrom can be greatly enhanced by providing an annular recess in the pole face surrounding the raised ring.

The pole caps with apertures therethrough can be provided in magnets which are mounted so as to rotate about a horizontal axis through the magnet air gap center as well as on stationary magnets.

Referring now to FIG. 8a showing a cross section of a portion of one side of a rotatable magnet, a hollow cylindrical bearing member 71 press-fitted within a bore through a magnet yoke 72 is rotatably mounted in trunion 73 supported from the magnet base, not shown. A pole member 74 is fixedly secured to the yoke 72 by means of screws 75, and an electric coil assembly 76 slips over the pole member 74. A removable substantially cylindrical pole cap 77 is secured against the pole member 74 by means of a hollow drawbar or rod 78. The drawbar 78 is threaded at one end into a threaded bore in the inner surface of the pole cap 77 and extends through cylindrical bores in the pole member 74 and the bearing member 71. Threads are provided in the bore at the outer end of the drawbar 78. The outer end of the bore in the bearing member 71 is threaded and a pole cap locking screw 79 is threaded into this bore. A hollow cap nut 81 is securely tightened in the threaded end of the drawbar 78. To draw the pole cap 77 tightly against the pole member 74, the pole cap locking screw 79 is turned out from the yoke 72, bearing against the cap nut 81 and thus forcibly moving the drawbar 78 to the right as viewed in FIG. 8a, thus pressing the pole cap 77 against the pole member 74. An aperture is provided through the pole cap 74 and is adapted to receive an adjustable sleeve 82 of one of the types shown in FIGS. 9-11 or FIGS. 13-15. As shown, this structure can also be provided with a shallow large diameter recess 83 on the inner surface of the pole cap whereby the homogeneity of the magnetic field can be adjusted as was described in detail with reference to FIGS. 6-7.

It is obvious that many different combinations of the methods and means of enhancing magnetic field homogeneity described above could be made other than the particular combinations shown and described.

While the different embodiments of the present invention have been described with respect to electromagnets, it is obvious that pole caps on permanent magnets could incorporate these features to improve the homogeneity of such magnets.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnet having two pole members forming an air gap, a circular pole cap mounted on the face of at least one of said members, said pole cap having an axially aligned hollow cylindrical recess in the surface adjacent to said member for increasing the homogeneity of the magnetic field in the air gap, and means for adjusting the size of said recess whereby a highly homogeneous magnetic field is provided in the air gap.

2. A magnet having two pole members forming an air gap, a circular pole cap mounted on the face of at least one of said members, said pole cap having an axially aligned, hollow cylindrical threaded recess in the surface adjacent to said member, and an adjustable slug member threadably inserted in said recess whereby said slug can be adjusted to change the size of said recess to thereby provide a highly homogeneous magnetic field across the air gap.

3. A magnet having two pole members forming an air gap, a circular pole cap mounted on the face of at least one of said members, said pole cap having an axially aligned relieved portion on the surface adjacent to the pole member extending from the center to adjacent the periphery of said pole cap, and means for applying a force to said pole cap whereby the pole cap can be bent thereby to provide a highly homogeneous magnetic field across the air gap.

4. A magnet having two pole members forming an air gap, at least one pole cap adapted to fit on a face of said pole member and provided with a relieved portion on a major surface adjacent to said pole member; said pole member, pole cap and relieved portion being coaxially disposed, the radius of said pole cap being substantially the same as that of the pole member, the radius of the relieved portion being less than but close to that of the pole cap, means for fixedly securing said pole cap to said pole member, and means for applying a force to said pole cap and directed substantially perpendicular to the major surface thereof whereby the pole cap can be bent thereby to provide a highly homogeneous magnetic field across the air gap.

5. A magnet forming an air gap and including a pole member provided with a bore therethrough aligned with the magnetic field of the magnet, a pole cap adapted to fit on one end of said pole member and provided with a relieved portion on the back surface thereof extending from the center thereof radially outwardly to adjacent the radial outward surface, a drawbar adapted to be fixedly secured in the back surface of said pole cap and to pass through the bore in said pole member and means for applying tension to said drawbar whereby the pole cap can be bent thereby to provide a highly homogeneous magnetic field across the magnet air gap.

6. A magnet forming an air gap and including at least one pole cap provided with a hollow bore therethrough aligned with the magnetic field of the magnet for providing access to the air gap of the magnet and adjustable means for providing a raised ring on the front surface of said pole cap around said bore thereby to provide a highly homogeneous magnetic field across the magnet air gap.

7. A magnet forming an air gap and including at least one pole cap provided with a hollow bore therethrough aligned with the magnetic field of the magnet for providing access to the air gap of the magnet and adjustable means for providing a raised ring on the front surface of said pole cap around said bore, an annular recess being provided around and concentric with said raised ring thereby to provide a highly homogeneous magnetic field across the magnet air gap.

8. A magnet forming an air gap and including at least one pole cap provided with a hollow bore therethrough aligned with the magnetic field of the magnet and an enlarged recess in the back surface thereof, an adjustable means for providing a raised ring on the front surface of said pole cap around said bore thereby to provide a highly homogeneous magnetic field across the magnet air gap into which access is provided through said bore in said pole cap.

9. A magnet forming an air gap and including at least one pole cap provided with a hollow bore therethrough aligned with the magnetic field of the magnet and an enlarged recess in the back surface thereof, an adjustable means for providing a raised ring on the front surface of said pole cap around said bore, an annular recess being provided around and concentric with said raised ring thereby to provide a highly homogeneous magnetic field across the magnet air gap to which access is provided through said bore in said pole cap.

10. A magnet forming an air gap and including at least one pole cap provided with a hollow bore therethrough aligned with the magnetic field of the magnet and with a relieved portion on the back surface thereof extending from the center thereof radially outwardly to adjacent the radial outward surface, adjustable means for providing a raised ring on the front surface of said pole cap around said bore, and means for applying a force to said pole cap whereby the pole cap can be bent thereby to provide a highly homogeneous magnetic field across the magnet air gap access to which is provided through said bore in said pole cap.

11. A magnet forming an air gap and including at least one pole cap provided with a hollow bore therethrough aligned with the magnetic field of the magnet and with a relieved portion on the back surface thereof extending from the center thereof radially outwardly to adjacent the radial outward surface, adjustable means for providing a raised ring on the front surface of said pole cap around said bore, an annular recess being provided around and concentric with said raised ring, and means for applying a force to said pole cap and directed substantially perpendicular to the front surface thereof whereby the pole cap can be bent thereby to provide a highly homogeneous magnetic field across the magnet air gap access to which is provided through said bore in said pole cap.

12. A magnet forming an air gap and including at least one pole cap provided with a hollow bore therethrough aligned with the magnetic field of the magnet and with a relieved portion on the back surface thereof extending from the center thereof radially outwardly to adjacent the radial outward surface, said pole cap being provided with a hollow cylindrical recess in the back surface thereof, means for adjusting the size of said recess, adjustable means for providing a raised ring on the front surface of said pole cap around said bore, an annular recess being provided around and concentric with said raised ring, and means for applying a force to said pole cap and directed substantially perpendicular to the front surface thereof whereby the pole cap can be bent thereby to provide a highly homogeneous magnetic field across the magnet air gap access to which is provided through said bore in said pole cap.

References Cited by the Examiner

UNITED STATES PATENTS

| | | | |
|---|---|---|---|
| 2,664,795 | 1/54 | Tone | 336—134 |
| 2,722,664 | 11/55 | Duncan et al. | 336—133 |
| 2,917,682 | 12/59 | Kirchner et al. | 317—158 |
| 2,947,920 | 8/60 | Hall | 317—158 |
| 3,017,544 | 1/62 | Kane et al. | 317—158 |
| 3,018,422 | 1/62 | Seaton | 317—158 |

FOREIGN PATENTS

| | | |
|---|---|---|
| 583,603 | 9/59 | Canada. |
| 824,860 | 12/59 | Great Britain. |

JOHN F. BURNS, *Primary Examiner.*

SAMUEL BERNSTEIN, *Examiner.*